UNITED STATES PATENT OFFICE.

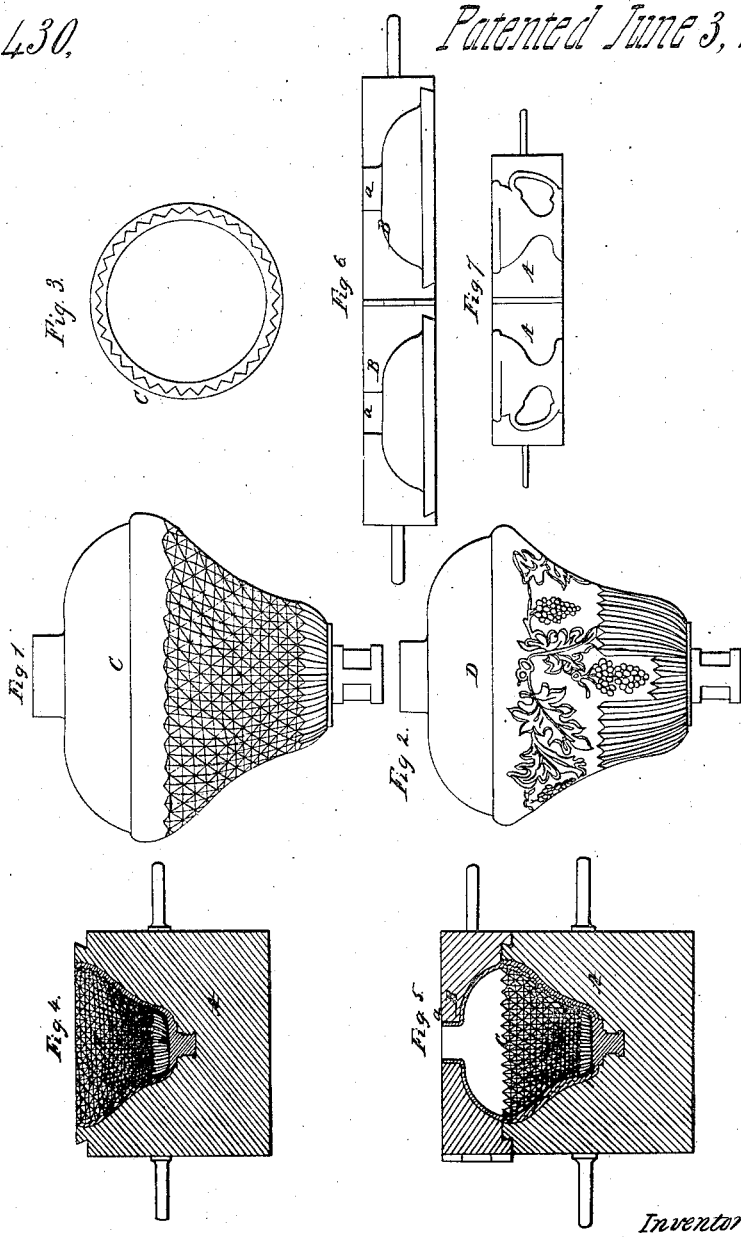

J. S. ATTERBURY, T. B. ATTERBURY, AND JAMES REDDICK, OF PITTSBURG, PENNSYLVANIA.

IMPROVEMENT IN THE MANUFACTURE OF HOLLOW GLASSWARE.

Specification forming part of Letters Patent No. 35,430, dated June 3, 1862.

*To all whom it may concern:*

Be it known that we, J. S. ATTERBURY, T. B. ATTERBURY, and JAMES REDDICK, of Pittsburg, in the county of Allegheny and State of Pennsylvania, have produced a new and Improved Manufacture of Plain or Smooth-Surfaced Ornamented Glassware; and we do hereby declare that the following is a full description of the same, reference being had to the accompanying drawings, forming part of this specification, in which—

Figures 1, 2, and 3 are elevations and a horizontal section of specimens of our improved new manufacture of glassware. Figs. 4, 5, 6, and 7 show means adapted for producing such specimens of hollow glassware with or without handles.

The usual method of producing ornaments upon glassware is by cutting or pressing the surface of the glass into various shapes. This not only leaves that surface uneven, so that it is not readily kept clean and polished, but the strength of the ware is thereby greatly diminished.

Our invention consists in producing the appearance of cut or ornamental pressed glass, while the surface is left smooth, so as to be readily cleansed, and while the strength of the ware is not essentially lessened.

We have ascertained that when figures or ornaments are formed on one piece of transparent glass by cutting or pressing the same, and when a portion of glass equally transparent is afterward made plastic by heat and then pressed or embedded into the first piece, so that the grooves and cavities formed therein are completely filled with the plastic glass, although the two parts are so thoroughly incorporated as to possess nearly or quite the same strength as though the glass had originally been formed of one entire piece, and although the outer and opposite surfaces of this combined piece of glass are entirely smooth, still without the interposition of any other material the form and appearance of the figures and ornaments are found to remain just as distinct as they were before the plastic glass was pressed and embedded, as described. Upon this principle we construct glassware which is smooth upon the surface, but which shall have the appearance of having been ornamented by cutting or pressing to any desired degree, and which, while it is equal in beauty, is far superior in convenience and strength to cut or pressed glass.

To enable others skilled in the art to make our new manufacture, we will proceed to describe such means and methods as we have found practically useful in its production, the said means and methods having been patented to us on the 11th of February, 1862.

In producing a lamp-bowl or "peg" with a solid wall, plain inner and outer surfaces and ornaments between such surfaces, as illustrated in Figs. 1, 2, and 3, an open-top flask, A, is used, said flask being in two parts and opening on a hinge and shaped internally to the form of the lower part of lamp-bowl. Into this flask melted glass is poured, and a solid plunger with the ornamental design wrought upon its surface and corresponding in shape and size to the interior of the lower portion of the desired lamp peg or bowl is pressed down upon the glass in the mold or flask. This operation produces an ornamentation and gives form to the glass, as illustrated in Fig 4. Another two part flask, B, opening on a hinge and made open at bottom, and with an orifice, *a*, in its top, is now placed upon the flask A. This flask B coresponds internally to the upper portion of the lamp bowl or peg, as will be seen in Figs. 5 and 6. The blower now gathers on his blow-pipe a quantity of glass and brings it to a proper form for blowing a coating over the ornamented surface of the partly-formed lamp-peg, (shown in Fig. 4,) and finishing the upper part of the lamp peg or bowl. This he places in the mold, Fig. 4, upon the device therein formed, and having closed the flask B upon the same, blows with with his blow-pipe upon the lump of glass until the ornamented surface is coated over and the upper portion of the article finished, as illustrated in Fig. 5. The result is a lamp-peg, C or D, accordingly as the surface of the device E was ornamented.

Instead of blowing the top portion of the lamp bowl or peg, the ornamented surface of the device E, Fig. 4, may be coated over by blowing glass upon it, and the top portion of the lamp-peg produced by heating the upper flaring edge of the lower portion and manipulating the glass with shears—ordinary tools in the common method. The mold or flask A in this case must be of such depth and form as to allow of the glass being extended over to form the top portion of the lamp bowl or peg.

The lamp-bowl may have a handle formed on it by modifying the form of the mold, as will be evident from Fig. 7. It is not, however, usual to form handles on the style of lamp-peg shown in Figs. 1 and 2, and therefore in Fig. 7 a mold for a different style of article is shown.

In the manufacture of open flared-mouthed articles—such as goblets—the same process may be followed in the coating over of the ornaments; but these articles must be warmed over the fire and their mouths flared and finished in the old way.

We have described and shown particularly but one style of article and two characters of ornamental design; but it is obvious that the improved new manufacture can be extended to a great variety of articles by simply making changes in the mold and in the character of the design, and still following the principle of operation set forth.

Our improved manufacture is very important, as it presents plain inner and outer surfaces and still appears as though the surfaces were channeled, flowered, or otherwise beautified with elevated or depressed ornaments, and by being thus plain-surfaced dirt cannot collect upon its ornaments, and the articles are less difficult to clean; nor are the designs or figures, when on the inner surface of the articles, injured in their effect upon the eye by the contact of oil or other fluid with them. The articles are also stronger and made at less cost, by reason of their walls being solid or the ornaments and component glass thereof united upon and to the component glass of the articles as one solid mass.

What we claim as our invention, and desire to secure by Letters Patent, is—

A new manufacture of glassware, which while it shall have smooth surfaces both without and within, and while its internal structure is entirely solid without any open spaces or interstices left therein, shall present the appearance of cut or pressed glass, substantially as and for the purpose above described.

J. S. ATTERBURY.
T. B. ATTERBURY.
JAS. REDDICK.

Witnesses:
A. B. STEVENSON,
JOHN C. STEVENSON.